US009647966B2

(12) United States Patent
Hsiao et al.

(10) Patent No.: US 9,647,966 B2
(45) Date of Patent: May 9, 2017

(54) DEVICE, METHOD AND NON-TRANSITORY COMPUTER READABLE STORAGE MEDIUM FOR PERFORMING INSTANT MESSAGE COMMUNICATION

(71) Applicant: Synology Incorporated, Taipei (TW)

(72) Inventors: Ping-Che Hsiao, Taipei (TW); Jia-Yu Liu, New Taipei (TW)

(73) Assignee: Synology Incorporated, Taipei (TW)

( * ) Notice: Subject to any disclaimer, the term of this patent is extended or adjusted under 35 U.S.C. 154(b) by 393 days.

(21) Appl. No.: 14/522,565

(22) Filed: Oct. 23, 2014

(65) Prior Publication Data
US 2015/0236987 A1  Aug. 20, 2015

(30) Foreign Application Priority Data

Feb. 18, 2014  (TW) .............................. 103105317 A

(51) Int. Cl.
*H04L 12/58* (2006.01)
*G06Q 10/10* (2012.01)

(52) U.S. Cl.
CPC ............. *H04L 51/04* (2013.01); *G06Q 10/10* (2013.01); *H04L 51/28* (2013.01)

(58) Field of Classification Search
CPC .......... H04L 51/04; H04L 51/28; G06Q 10/10
See application file for complete search history.

(56) References Cited

U.S. PATENT DOCUMENTS 6,941,348 B2 *  9/2005  Petry ..................... H04L 12/585
709/206

7,603,413 B1 *  10/2009  Herold .................... G06Q 10/10
455/466

(Continued)

FOREIGN PATENT DOCUMENTS

| CN | 1674564 A | 9/2005 |
|---|---|---|
| CN | 101364971 A | 2/2009 |

(Continued)

OTHER PUBLICATIONS

Saint-Andre Cisco P: "Extensible Messaging and Presence Protocol (XMPP): Instant Messaging and Presence; rfc6121.txt", Internet Engineering Task Force (IETF); Mar. 30, 2011, pp. 1-114.

(Continued)

*Primary Examiner* — Kevin Bates
*Assistant Examiner* — Brandon L Sykes
(74) *Attorney, Agent, or Firm* — CKC & Partners Co., Ltd.

(57) ABSTRACT

An instant message communication device that includes a database, a data transmission module, a processing module, and a memory is provided. When commands stored in the memory are performed by the processing module, the following operations are performed. User information that includes a user account is received through the data transmission module. An instant message software robot is driven to add the user account into a robot contact list of a robot account. An account pair relation corresponding to the user account and the robot account is stored in the database. A request is transmitted to a user device having the user account through the data transmission module. The robot account is determined being added to a user contact list. The instant message software robot is controlled to perform an instant message communication with the user device through the data transmission device according to the account pair relation.

20 Claims, 5 Drawing Sheets

(56) References Cited

U.S. PATENT DOCUMENTS

| | | | |
|---|---|---|---|
| 2003/0182391 A1 | 9/2003 | Leber et al. | |
| 2004/0030750 A1 | 2/2004 | Moore et al. | |
| 2006/0075029 A1 | 4/2006 | Kelso et al. | |
| 2006/0259555 A1 | 11/2006 | Hassounah et al. | |
| 2007/0220143 A1* | 9/2007 | Lund | H04L 12/581 709/224 |
| 2009/0055485 A1* | 2/2009 | Tsai | H04L 51/04 709/206 |
| 2010/0191812 A1* | 7/2010 | O'Donovan | G06Q 10/107 709/206 |
| 2011/0066686 A1* | 3/2011 | Gamaley | H04L 12/1822 709/206 |
| 2012/0215871 A1* | 8/2012 | Zhang | G06Q 30/0269 709/206 |
| 2013/0144961 A1* | 6/2013 | Park | H04L 51/046 709/206 |

FOREIGN PATENT DOCUMENTS

| | | |
|---|---|---|
| CN | 101888391 A | 11/2010 |
| TW | 201324387 | 6/2013 |

OTHER PUBLICATIONS

Leigh Griffin et al: "Scaling Instant Messaging communication services: A Comparison of Blocking and Non-blocking Techniques", IEEE, Jun. 28, 2011, pp. 550-557.

* cited by examiner

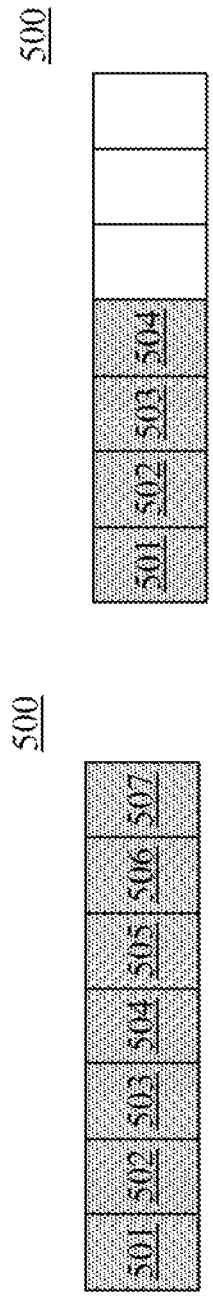
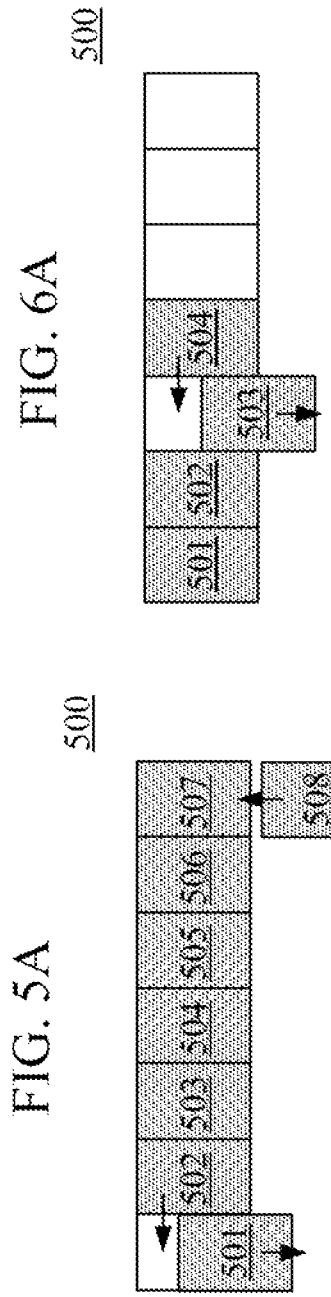
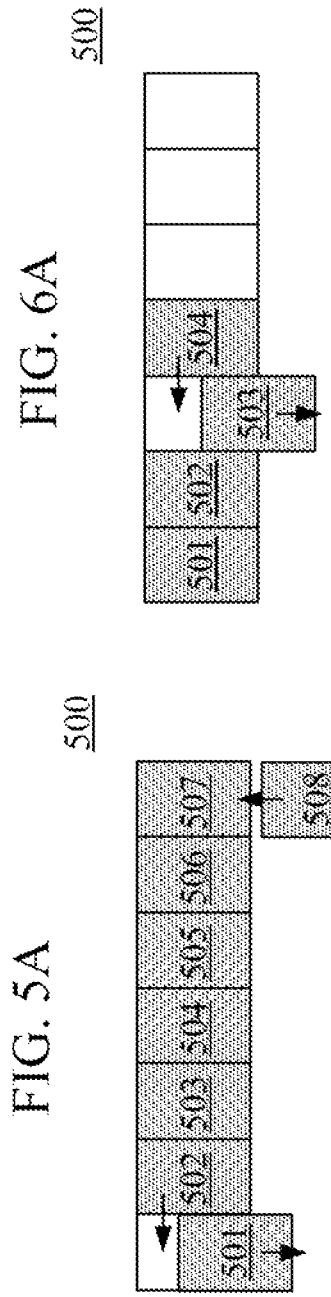
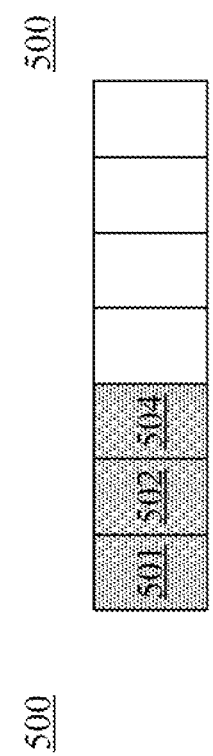
FIG. 5A
FIG. 5B
FIG. 5C
FIG. 6A
FIG. 6B
FIG. 6C

DEVICE, METHOD AND NON-TRANSITORY COMPUTER READABLE STORAGE MEDIUM FOR PERFORMING INSTANT MESSAGE COMMUNICATION

RELATED APPLICATIONS

This application claims priority to Taiwanese Application Serial Number 103105317, filed Feb. 18, 2014, which is herein incorporated by reference.

BACKGROUND

Field of Invention

The present invention relates to an instant messaging technology. More particularly, the present invention relates to a device and a method for performing an instant message communication and a non-transitory computer readable storage medium thereof.

Description of Related Art

With the advent of digital age, electronic devices have become indispensable media for accessing information and knowledge and communicating with others by modern people. In addition, with the rapid development of network technology, electronic devices can access various kinds of network services through Internet among which instant message communication has become one of the popular digital network services.

Instant messaging software can provide a means for instantly transmitting messages through Internet. However, the instant messaging software usually limits the number of contacts that are allowed to be added into the contact list of a single account. For advertising service providers or consulting service providers who provide services to clients through the instant messaging software, it requires lots of robot accounts to maintain interactions with the clients because of such a limitation, which results in low efficiency and waste of resources in managerial aspects.

For the forgoing reasons, there is a need for solving the above-mentioned problems by designing a device, a method, and a non-transitory computer readable storage medium for performing an instant message communication, which is an issue that the industry eagers to address.

SUMMARY

An instant message communication device is provided. The instant message communication device comprises a database, a data transmission module, a processing module, and a memory. The processing module is coupled to the database and the data transmission module. The memory has a plurality of commands executable by a computer stored in the memory. The memory is coupled to the processing module. The following operations are performed when the commands are performed by the processing module: receiving user information through the data transmission module, the user information comprising a user account; driving an instant message software robot to add the user account into a robot contact list of a robot account of the instant message software robot; storing an account pair relation corresponding to the user account and the robot account in the database; controlling the instant message software robot to transmit a request for adding to a contact list to a user device having the user account through the data transmission module; determining the robot account of the instant message software robot being added to a user contact list of the user account; and controlling the instant message software robot to perform an instant message communication with the user device through the data transmission module according to the account pair relation in the database.

The invention provides an instant message communication method applied to an instant message communication device. The instant message communication method includes: receiving user information by a processing module through a data transmission module, the user information comprising a user account; driving an instant message software robot by the processing module to add the user account into a robot contact list of a robot account of the instant message software robot; storing an account pair relation corresponding to the user account and the robot account in a database by the processing module; controlling the instant message software robot by the processing module to transmit a request for adding to a contact list to a user device having the user account through the data transmission module; determining the robot account of the instant message software robot being added to a user contact list of the user account by the processing module; and controlling the instant message software robot by the processing module to perform an instant message communication with the user device through the data transmission module according to the account pair relation in the database.

The invention further provides a non-transitory computer readable storage medium. The non-transitory computer readable storage medium stores a computer program. The computer program includes a plurality of commands executable by a computer configured for performing an instant message communication method applied to an instant message communication device. The instant message communication method comprising: receiving user information by a processing module through a data transmission module, the user information comprising a user account; driving an instant message software robot by the processing module to add the user account into a robot contact list of a robot account of the instant message software robot; storing an account pair relation corresponding to the user account and the robot account in a database by the processing module; controlling the instant message software robot by the processing module to transmit a request for adding to a contact list to a user device having the user account through the data transmission module; determining the robot account of the instant message software robot being added to a user contact list of the user account by the processing module; and controlling the instant message software robot by the processing module to perform an instant message communication with the user device through the data transmission module according to the account pair relation in the database.

It is an advantage of the present invention that, by designing the instant message communication device, the instant message communication method, and the non-transitory computer readable storage medium thereof, the account pair relation corresponding to the user account and the instant message software robot is stored in the database to allow the instant message communication device to perform an instant message communication with the user device according to the account pair relation without being limited by the type of the instant messaging software and the capacity of the robot contact list.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. the drawings.

FIG. 5A to FIG. 5C are respectively schematic diagrams of a queue included in a robot contact list according to one embodiment of this invention; and FIG. 6A to FIG. 6C are respectively schematic diagrams of a queue included in a robot contact list according to one embodiment of this invention.

DESCRIPTION OF THE EMBODIMENTS

Figure 1:
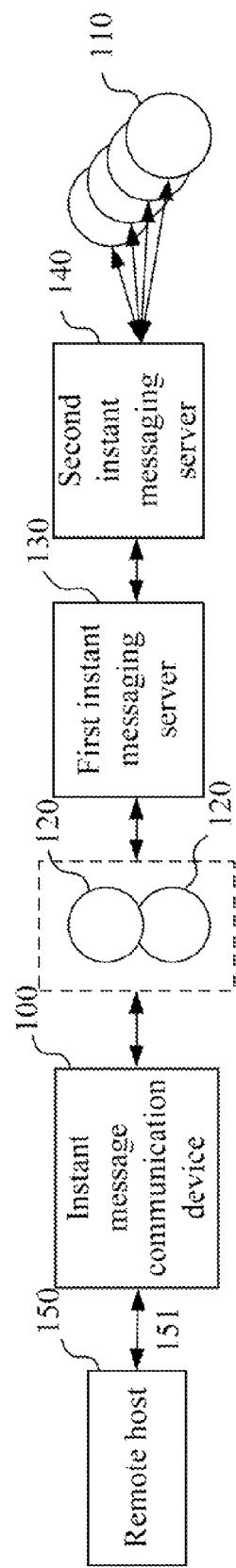
FIG. 1 is a block diagram of an instant message communication device and a user device according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of an instant message communication device 100 and a user device 110 according to one embodiment of this invention.

The instant message communication device 100 may be any type of electronic device having a communication capability, such as but not limited to, a mainframe or a server. The instant message communication device 100 is configured for driving a plurality of instant message software robots 120 so as to perform instant message communications with other electronic devices through a first instant messaging server 130.

In FIG. 1, the instant message software robots 120 are depicted outside the instant message communication device 100 as an example. However, in practical implementations, the instant message software robots 120 may be software operating on the instant message communication device 100. In various embodiments, a number of the instant message software robots 120 is adjustable as required and is not limited to the number depicted in FIG. 1.

In one embodiment, as shown in FIG. 1, the first instant messaging server 130 may be a server independent of the instant message communication device 100. The instant message communication device 100 performs a communication with the first instant messaging server 130 through Internet, other embodiments, the first instant messaging server 130 may be a hardware facility integrated into the instant message communication device 100, or an application program operating on the instant message communication device 100, and is not limited to the embodiment depicted in FIG. 1.

The user device 110 may be any type of electronic device having a communication capability, such as but not limited to, a mainframe or a handheld electronic device. The user device 110 can perform instant message communications with other electronic devices through a second instant messaging server 140 by instant messaging software stored in the user device 110.

In one embodiment, when the same instant messaging systems are operated in the first instant messaging server 130 and the second instant messaging server 140, the instant message communication device 100 can perform an instant message communication with the user device 110 through the instant message software robots 120. It is noted that the instant message communication is a two-way communication. That is, the instant message communication device 100 can transmit instant messages to the user device 110, and the user device 110 can also transmit instant messages to the instant message communication device 100.

For example, when each of the instant messaging systems operated in the first instant messaging server 130 and the second instant messaging server 140 is a system such as Skype, MSN, or the instant messaging system operated based on other XMPP protocol, the instant message communication device 100 can perform an instant message communication with the user device 110 through the instant message software robots 120.

In another embodiment, when the instant messaging system operated by one of the first instant messaging server 130 and the second instant messaging server 140 can communicate with various types of instant messaging systems, such as but not limited to, Lync, the instant message communication device 100 can also perform the instant message communication with the user device 110 through the instant message software robots 120.

For example, when the Lync instant messaging system is operated in the first instant messaging server 130, and the instant messaging system, such as Skype, MSN, or the instant messaging system operating based on other XMPP protocol is operated in the second instant messaging server 140, the instant message communication device 100 can perform an instant message communication with the user device 110 through the instant message software robots 120.

In one embodiment, the instant message communication device 100 can perform an instant message communication with the user device 110 through the instant message software robots 120 according to a control command 151 that is received by a remote mainframe 150. In one embodiment, the control command 151 may include, such as but not limited to, a robot account included in the instant message software robot 120 to be controlled, a user account on the user device 110, and a content of an instant message.

In a usage scenario, an enterprise operator can control the instant message communication device 100 through the remote mainframe 150 so as to transmit advertisements, notifications, or prompt messages to the user device 110 owned by the client by the above-mentioned instant messaging mechanism. In addition, the enterprise operator can also receive messages transmitted from the user device 110 owned by the client through the instant message communication device 100 by the above-mentioned instant messaging mechanism so as to provide consulting services.

Figure 2:
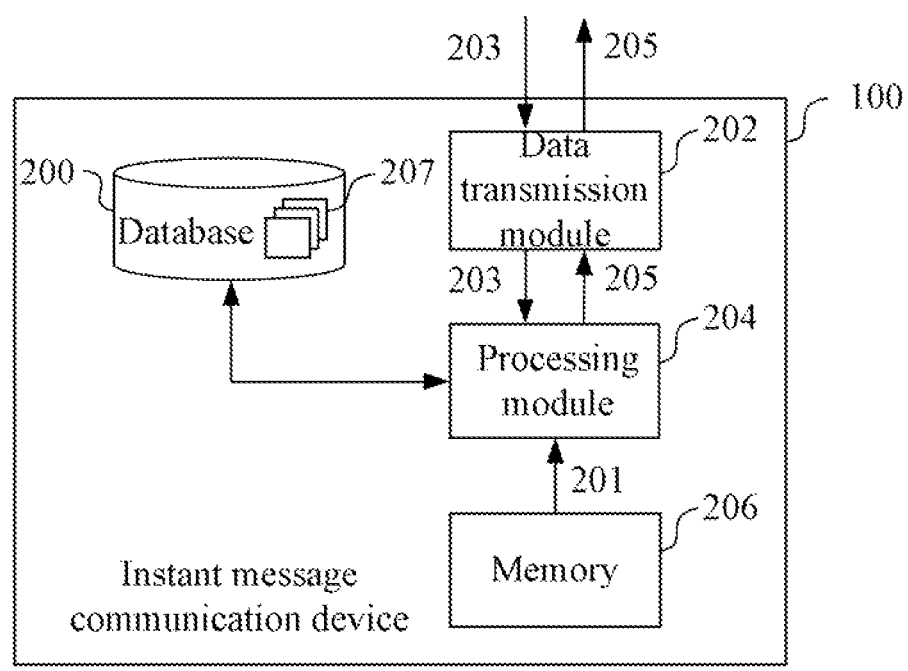
FIG. 2 is a detailed block diagram of an instant message communication device according to one embodiment of this invention.

A description is provided with reference to FIG. 1 and FIG. 2. FIG. 2 is a detailed block diagram of the instant message communication device 100 according to one embodiment of this invention. The instant message communication device 100 includes a database 200, a data transmission module 202, a processing module 204, and a memory 206.

The database 200 may be implemented by different types of storage devices in different embodiments, such as but not limited to, a read only memory (ROM), a flash memory, a floppy disk drive, a hard disk drive, an optical disk drive, a USB HDD, a magnetic tape, a database accessible through a network, or other type of storage device, so as to store information.

The data transmission module 202 may be various types of modules that is able to allow the processing module 204 to communicate with other devices in various embodiments, such as but not limited to, a wired or wireless network data transmission module, so as to perform data transmission with other devices in various possible network communication forms and under various possible specifications.

The processing module 204 is coupled to the database 200 and the data transmission module 204. The processing module 204 may be various types of processors having an arithmetic capability and can perform data transmission with the above-mentioned database 200 and data transmission module 202 via different data transmission paths. The memory 206 may be, such as but not limited to, a read only memory, a flash memory, a floppy disk drive, a hard disk drive, an optical disk drive, a USB HDD, a magnetic tape, a database accessible through a network, or other type of memory in various embodiments, so as to store a plurality of commands 201 executable by a computer and is coupled to the processing module 204. The processing module 204 can perform operations according to the commands 201 stored in the memory 206 so as to provide functions to the instant message communication device 100.

Figure 3:
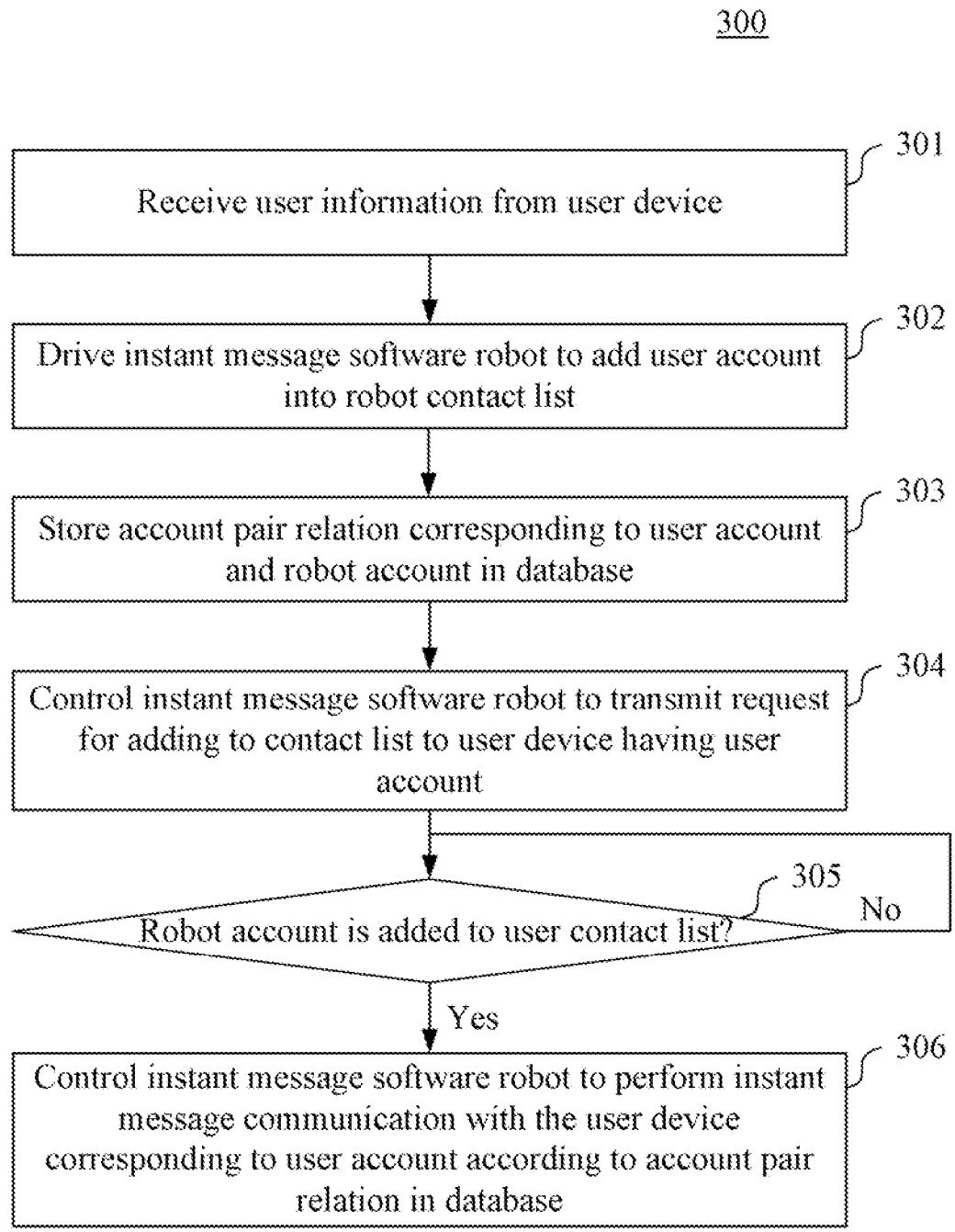
FIG. 3 is a flow chart of an instant message communication method according to one embodiment of this invention.

FIG. 3 is a flow chart of an instant message communication method 300 according to one embodiment of this invention. The instant message communication method 300 can be used in the instant message communication device 100 depicted in FIG. 1 and FIG. 2, or can be implemented by other hardware devices, such as a database, a common processor, a calculator, a server, or other specific hardware devices having a specific logic circuit or equipment having a specific function, such as integrating source code_and a processor/chip into specific hardware. The method may be realized as a computer program and stored in a non-transitory computer readable storage medium to allow a computer to perform the instant message communication method 300 after reading the storage medium. The non-transitory computer readable storage medium may be a read only memory, a flash memory, a floppy disk drive, a hard disk drive, an optical disk drive, a USB HDD, a magnetic tape, a database accessible through a network, or any other computer readable storage medium those of ordinary skill in the art can easily think of and having the same function.

In the following paragraphs, operations performed by the processing module 204 in the instant message communication device 100 is described by using the instant message communication method 300 with reference to the elements and reference signs of the same illustrated in FIG. 1 and FIG. 2.

The instant message communication method 300 includes the following steps (it should be understood that the sequence of the steps described in the present embodiment method, unless otherwise specified, may be changed as required by practical needs, or the steps or part of the steps may be performed simultaneously).

In step 301, the processing module 204 receives user information 203 from the user device 110 through the data transmission module 202.

The user information 203 may include a user account. In one embodiment, the user account may be, such as but not limited to, an account for the instant messaging system, such as Skype, MSN, or the instant messaging system operating based on other XMPP protocol. The user owns the user account can log into a server of a instant messaging system correspondingly (such as but not limited to the second instant messaging server 140) by using an instant messaging software with the user account, and perform an instant message communication with other user owned other user account.

In one embodiment, the processing module 204 may receive the user information 203 in various network communication forms. For example, the instant message communication device 100 may be integrated into a web server (not shown in the figure). The user can thus transmit the user information 203 to the instant message communication device 100 from any electronic device through a web interface.

In step 302, the processing module 204 drives the instant message software robot 120 so as to add the user account into a robot contact list (not shown in the figure) of a robot account of the instant message software robot 120.

In one embodiment, the instant message software robots 120 are initiated by the processing module 204 and operate in it. The processing module 204 may allow more than one of the instant message software robots 120 to operate simultaneously. In one embodiment, each of the instant message software robots 120 may include more than one robot account. Hence, after the processing module 204 receives the user information 203 and the user account, the processing module 204 selects one of the instant message software robots 120 from the instant message software robots 120 under selection, and then selects one of the robot accounts included in the instant message software robot 120, and the selected instant message software robot 120 serves as the instant message software robot 120 responsible for contacting the user account.

Furthermore, the processing module 204 stores the user account in the robot contact list of the selected robot account of the selected instant message software robot 120.

Figure 4:
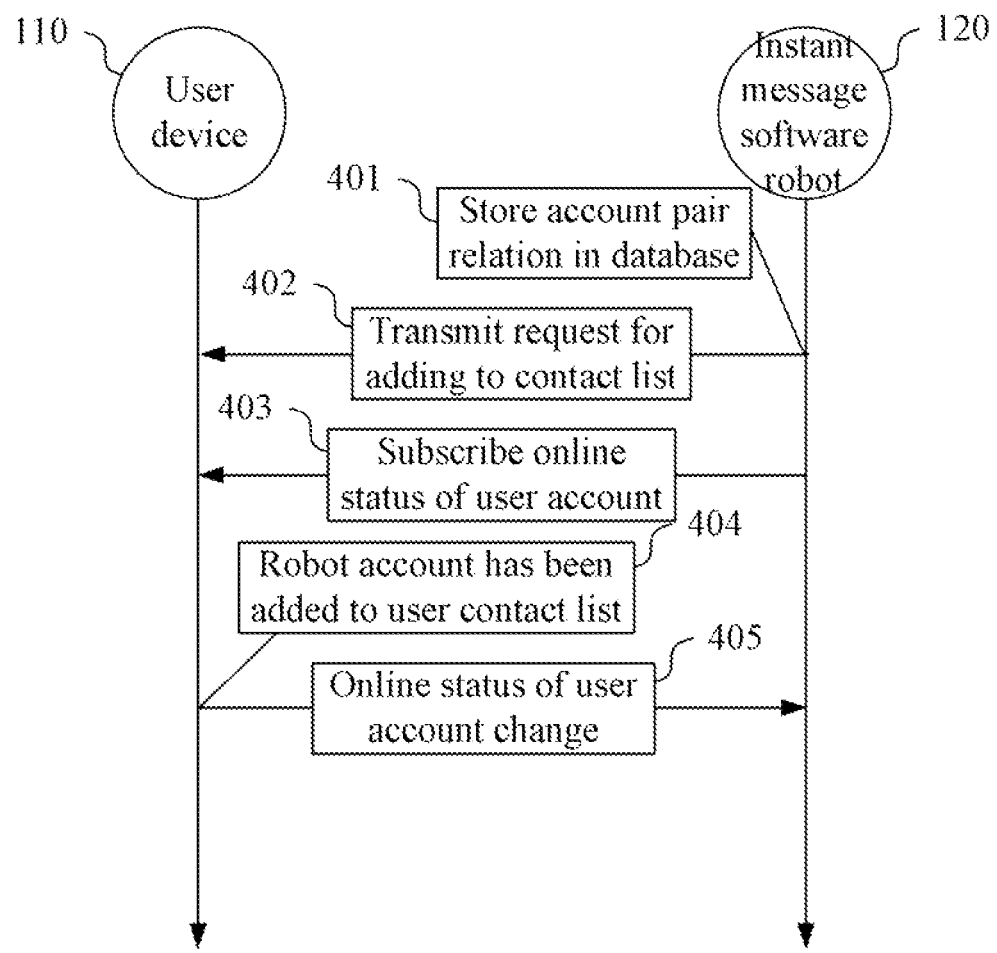
FIG. 4 is a schematic diagram of a user device and an instant message software robot and their relevant timing sequences according to one embodiment of this invention.

FIG. 4 is a schematic diagram of the user device 110 and the instant message software robot 120 and their relevant timing sequences according to one embodiment of this invention. A description is provided with reference to the following steps 303-305 and the timing sequences in FIG. 4.

In step 303, the processing module 204 stores an account pair relation 207 corresponding to the user account and the robot account included in the instant message software robot 120 in the database 200, as shown in a timing sequence 401 of FIG. 4.

In one embodiment, besides the robot account and the user account, the account pair relation 207 may also include, such as but not limited to, information of time points for adding and pair statuses.

In step 304, the processing module 204 further controls the instant message software robot 120 to transmit a request for adding to a contact list 205 to the user device 110 having the user account through the first instant messaging server 130 and the second instant messaging server 140 by utilizing the data transmission module 202, as shown in a timing sequence 402 of FIG. 4.

In greater detail, the processing module 204 will control the instant message software robot 120 to transmit the request for adding to the contact list 205 to the user device 110 through the first instant messaging server 130 and the second instant messaging server 140, as shown in FIG. 1, by utilizing the data transmission module 202. It is noted that step 304 and step 302 proceed almost simultaneously in one embodiment. For example, after the instant message software robot 120 is driven to add the user account to the robot contact list, the request for adding to the contact list 205 is immediately transmitted to the user device 110 through the first instant messaging server 130 and the second instant messaging server 140 by utilizing the data transmission module 202.

Then, in step 305, the processing module 204 determines whether the robot account of the instant message software robot 120 is added to a user contact list (not shown in the figure) of the user account.

In one embodiment, after the user account is added to the robot contact list of the robot account of the instant message software robot 120, the instant message software robot 120 driven by the processing module 204 will subscribe an online status of the user account, as shown in a timing sequence 403 of FIG. 4.

In greater detail, the process of the subscription is that the instant message software robot 120 first subscribes the first instant messaging server 130 as shown in FIG. 1 and the first instant messaging serve 130 further subscribes the second instant messaging server 140. With the process of the subscription, the processing module 204 is able to detect the online status of the user account.

When the online status of the user account does not change, such as being kept in an offline status, the processing module 204 determines that the robot account has not been added to the user contact list of the user account. The flow proceeds back to step 305, and the processing module 204 continues to wait for the robot account to be added to the user contact list.

When the robot account has been added to the user contact list of the user account, as shown in a timing sequence 404 of FIG. 4, the processing module 204 will detect that the online status of the user account changes, as shown in a timing sequence 405 of FIG. 4, such as changing from the offline status to the online status. The processing module 204 determines that the robot account has been added to the user contact list of the user account accordingly. At this time, the user account recorded in the account pair relation 207 is in a controlled state such that the user account can be managed by and communicated with the instant message software robot 120.

Therefore, in step 306, the processing module 204 controls the instant message software robot 120 to perform an instant message communication with the user device 110 corresponding to the user account through the data transmission module 202 according to the account pair relation 207 in the database 200.

In greater detail, the processing module 204 can directly control the instant message software robot 120 to perform an instant message communication with the user device 110 corresponding to the user account through the first instant messaging server 130 and the second instant messaging server 140, as shown in FIG. 1, by utilizing the data transmission module 202 according to the account pair relation 207 in the database 200.

As mentioned previously, in one embodiment, the instant message communication device 100 may be integrated into a webpage server to provide the webpage interface so that the user is allowed to transmit the ser information 203 to the instant message communication device 100. After the account pair relation 207 is established, the processing module 204 can further display the robot account of the instant message software robot 120 which establishes the account pair relation 207 with the user account on the webpage interface. The user is thus able to confirm that the added robot account belongs to the instant message communication device 100 of the correct service provider.

Hence, with the above mechanism, the instant message communication device 100 only needs to utilize the account pair relation 207 stored in the database 200 when an instant message communication is performed with the user device 110, and is unrelated with the robot contact list of the instant message software robot 120. That is, the instant message communication device 100 does not need to be limited by the capacity of the robot contact list of the instant message software robot 120 itself, and is allowed to pair with more users and perform management.

Furthermore, when an instant messaging system being able to communicate with various types of instant messaging systems, such as Lync, is operated in the first instant messaging server 130, the instant message communication device 100 can further communicate with users without being limited by the type of the instant messaging system.

In one embodiment, when the processing module 204 of the instant message communication device 100 intends to add a new user account to the robot contact list in the above-mentioned step 302, whether the robot contact list is full is determined and an action is taken correspondingly when the robot contact list is full.

FIG. 5A to FIG. 5C are respectively schematic diagrams of a queue 500 included in a robot contact list according to one embodiment of this invention.

In one embodiment, the robot contact list includes, such as but not limited to, a queue 500 in a first in first out (FIFO) form, so as to store the user account.

For example, in FIG. 5A, the queue 500 includes user accounts 501-507 which are added in sequence. That is, the instant message software robot 120 corresponding to the queue 500 has added the seven user accounts 501-507 to the queue 500 of the robot contact list, and the user account 501 is the earliest data being added and the user account 507 is the latest data being added.

When the processing module 204 intends to add a new user account 508 to the queue 500, the oldest data (that is, the user account 501) is removed from the queue and the newest data (that is, the user account 508) is added to the queue 500 according to the first in first out principle, as shown in FIG. 5B.

Hence, after the user account 501 is removed and the user account 508 is added, the queue 500 stores the user accounts 502-508, as shown in FIG. 5C.

In some embodiments, the processing module 204 may also be set to check the robot contact list every a fixed period, such as but not limited to, once a day or once a week so as to determine whether any of the user accounts 501-507 has been added longer than a preset threshold value. If any of the user accounts 501-507 has been added longer than the preset threshold value, the user account is directly removed from the robot contact list.

In one embodiment, when the user account is removed from the robot contact list, the account pair relation 207 stored in the database 200 will not be removed. If the first instant messaging server 130 and the second instant messaging server 140 provide the function of checking whether the user account has deleted the robot account from the contact list, the processing module 204 cannot delete the account pair relation 207 stored in the database 200 until the robot account is confirmed to be deleted the from the contact list of the user account.

In another embodiment, the processing module 204 of the instant message communication device 100 may remove the user account from the robot contact list after the above-mentioned step 305 (equivalent to the timing sequence 405 in FIG. 4) so as to alleviate the load of instant message software robot 120.

FIG. 6A to FIG. 6C are respectively schematic diagrams of the queue 500 included in a robot contact list according to one embodiment of this invention.

For example, in FIG. 6A, the queue 500 includes user accounts 501-504, That is, the instant message software robot 120 corresponding to the queue 500 has added the four user accounts 501-504 to the queue 500 of the robot contact list When, for example, a change of the online status of the user account 503 is detected by the processing module 204 as mentioned previously in step 305 and after the processing module 204 stores the account pair relation 207 corresponding to the user account 503 and the instant message software robot 120 in the database 200 in step 303, the processing module 204 can remove the user account 503 from the queue 500, as shown in FIG. 6B.

Hence, the queue 500 only stores the user accounts 501, 502 and 504 after the user account 503 is removed, as shown in FIG. 6C.

According to the above embodiments, the instant message communication device 100 can render the user account temporarily stored in the robot contact list of the instant message software robot 120 being removed efficiently so as to alleviate the load of instant message software robot 120. As a result, the problem that the capacity of the robot contact list is not enough can be avoided.

In one embodiment, when the processing module 204 of the instant message communication device 100 intents to select one of the instant message software robots 120 to be selected so as to add the user account in the above-mentioned step 302, the instant message software robots 120 to be selected can be compared to respectively calculate their loads so as to select the instant message software robot 120 having the lowest load to add the user account.

In one embodiment, the load may include a free space of the robot contact list of each of the instant message software robots 120.

The free space of the robot contact list may be, for example, a free space of the queue 500 included in each of the above robot contact lists. Hence, the processing module 204 can preferably select the instant message software robot 120 having a larger free space in the robot contact list to add the user account so as to avoid that the user account added earlier needs to be removed because there is no vacancy in the queue 500 having a smaller free space in the robot contact list.

In one embodiment, the load may include a number of the paired and controlled user accounts that each of the instant message software robots 120 has.

The number of the paired and controlled user accounts is, for example, a number of the user accounts that the robot account of each of the instant message software robots 120 pairs and manages and has been allowed to perform an instant message communication with. The greater the number of the paired and controlled user accounts is, the instant load flow of the message will become higher because this indicates that the instant message software robot 120 performs, for example, a broadcast instant message communication.

Therefore, the processing module 204 can preferably select the instant message software robot 120 having a smaller number of the paired and controlled user accounts to add the user account so as to avoid that the instant message software robot 120 having a greater number of paired and controlled user accounts generates an over high instant load flow.

In one embodiment, the load may include a message utilization flow rate that each of the instant message software robots 120 has.

The message utilization flow rate may include, such as but not limited to, a long term average message volume, a short term average message volume, a number of times that instant message overloads, or their combinations in one embodiment. In one embodiment, the message utilization flow rate may be determined by the following formula based on the above-mentioned long term average message volume, short term average message volume, and number of times that instant message overloads:

$$f(x,y,z)=a_1 \times (x/1440N)+a_2 \times (y/M)+a_3 \times z$$

Wherein x denotes a total message volume within N days, y denotes a total message volume within M minutes, z denotes a number of times that an instant message volume exceeds a preset threshold value, and $a_1$, $a_2$, and $a_3$ denote weight coefficients.

In the above formula, x/1440N denotes an average message volume per minute in N days to define the long term average message volume, denotes an average message volume per minute in M minutes to define the short term average message volume within a shorter period relative to the period based on which the long term average message volume is obtained, denotes the number of times that instant message overloads. The message utilization flow rate can be calculated by properly setting the weight coefficients based on the long term average message volume, the short term average message volume, and the number of times that instant message overloads.

Hence, the processing module 204 can preferably select the instant message software robot 120 having a lower message utilization flow rate to add the user account so as to avoid that the instant message software robot 120 having a higher message utilization flow rate generates an over high message load.

The processing module 204 can perform an evaluation on the instant message software robots 120 to select the instant message software robot 120 having the lowest load so as to add the user account, by considering all the above-mentioned free space of the robot contact list, number of paired and controlled user accounts, message utilization flow rate, or their combinations. As a result, the loads of the instant message software robots 120 are balanced.

It is noted that, in other embodiments, the processing module 204 may also determine the load based on other parameters so as to control the load balance between the instant message software robots 120 more efficiently.

In summary, the instant message communication device, the instant message communication method, the non-transitory computer readable storage medium thereof can store the account pair relation 207 corresponding to the user account and the instant message software robot 120 in the database 200 to allow the instant message communication device 100 to perform an instant message communication with the user device 110 according to the account pair relation 207 without being limited by the type of the instant messaging software and the capacity of the robot contact list of the instant message software robot 120. In addition, the instant message communication device 100 can reduce to the load of the instant message software robot 120 by removing the user account stored in the robot contact list after the account pair relation 207 is established. Additionally, the instant message communication device 100 can select the instant message software robot 120 having low load to add the new user account by calculating the loads to achieve the load balance between different instant message software robots 120.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An instant message communication device comprising:
   a database;
   a data transmission module;
   a processing module coupled to the database and the data transmission module; and
   a memory storing a plurality of commands executable by the processing module, the memory being coupled to the processing module, the following operations being performed when the commands are executed by the processing module:
   receiving user information through the data transmission module, the user information comprising a user account;
   driving an instant message software robot to add the user account into a robot contact list of a robot account of the instant message software robot;
   storing an account pair relation corresponding to the user account and the robot account in the database;
   controlling the instant message software robot to generate a request for adding the instant message software robot to a contact list of a user device having the user account;
   controlling the instant message software robot to send the request to the user device through the data transmission module;
   determining the robot account of the instant message software robot being added to the contact list of the user device; and
   controlling the instant message software robot to perform an instant message communication with the user device through the data transmission module according to the account pair relation in the database.

2. The instant message communication device of claim 1, wherein the processing module further detects an online status of the user account so as to determine that the robot account is added to the user contact list of the user device when the online status changes.

3. The instant message communication device of claim 1, wherein the processing module further removes the user account from the robot contact list after determining that the robot account of the instant message software robot is added to the user contact list of the user device.

4. The instant message communication device of claim 1, wherein the robot contact list comprises a queue, the processing module further determines whether the queue is full before adding the user account to the queue so that an earliest user account that was added to the queue is removed to add the user account to the queue when the queue is full.

5. The instant message communication device of claim 1, wherein the processing module calculates a load of each of a plurality of instant message software robots to be selected and selects the instant message software robot having the lowest load among the instant message software robots to be selected to be the instant message software robot based on the loads.

6. The instant message communication device of claim 5, wherein the load comprises one or more of a free space of a robot contact list of each of the instant message software robots to be selected, a number of paired user accounts of each of the instant message software robots to be selected, a message utilization flow rate of each of the instant message software robots to be selected.

7. The instant message communication device of claim 6, wherein the message utilization flow rate comprises one or more of a long term average message volume, a short term average message volume, a number of times that instant message overloads.

8. The instant message communication device of claim 1, wherein the processing module performs the instant message communication with the user device through a first instant messaging server corresponding to the instant message software robot and a second instant messaging server corresponding to the user account by utilizing the instant message software robot.

9. The instant message communication device of claim 8, wherein an instant messaging system comprised in the first instant messaging server has a capability to communicate with a plurality of other types of instant messaging systems.

10. The instant message communication device of claim 1, wherein the processing module further receive a control command from a remote mainframe through the data transmission module so as to perform the instant message communication with the user device according to the control command and the account pair relation in the database through the data transmission module.

11. An instant message communication method applied to an instant message communication device, the instant message communication method comprising:
    receiving user information by a processing module through a data transmission module, the user information comprising a user account;
    driving an instant message software robot by the processing module to add the user account into a robot contact list of a robot account of the instant message software robot;
    storing an account pair relation corresponding to the user account and the robot account in a database by the processing module;
    controlling the instant message software robot by the processing module to generate a request for adding the instant message software robot to a contact list of a user device having the user account;
    controlling the instant message software robot to send the request to the user device through the data transmission module;
    determining the robot account of the instant message software robot being added to the user contact list of the user device by the processing module; and
    controlling the instant message software robot by the processing module to perform an instant message communication with the user device through the data transmission module according to the account pair relation in the database.

12. The instant message communication method of claim 11, further comprising:
    detecting an online status of the user account by the processing module so as to determine that the robot account is added to the user contact list of the user device when the online status changes.

13. The instant message communication method of claim 11, further comprising:
removing the user account from the robot contact list by the processing module after the processing module determines that the robot account of the instant message software robot is added to the user contact list of the user device.

14. The instant message communication method of claim 11, wherein the robot contact list comprises a queue, the instant message communication method further comprises:
determining whether the queue is full by the processing module before adding the user account to the queue of the robot contact list;
removing an earliest user account that was added to the queue by the processing module when the queue is full; and
adding the user account to the queue by the processing module.

15. The instant message communication method of claim 11, further comprising:
calculating a load of each of a plurality of instant message software robots to be selected by the processing module; and
selecting the instant message software robot having the lowest load among the instant message software robots to be selected to be the instant message software robot by the processing module based on the loads.

16. The instant message communication method of claim 15, wherein the load comprises one or more of a free space of a robot contact list of each of the instant message software robots to be selected, a number of paired user accounts of each of the instant message software robots to be selected, a message utilization flow rate of each of the instant message software robots to be selected.

17. The instant message communication method of claim 16, wherein the message utilization flow rate comprises one or more of a long term average message volume, a short term average message volume, a number of times that instant message overloads.

18. The instant message communication method of claim 11, further comprising:
performing the instant message communication with the user device by the processing module through a first instant messaging server corresponding to the instant message software robot and a second instant messaging server corresponding to the user account by utilizing the instant message software robot, and an instant messaging system comprised in the first instant messaging server having a capability to communicate with a plurality of other types of instant messaging systems.

19. The instant message communication method of claim 11, further comprising:
receiving a control command from a remote mainframe through the data transmission module by the processing module; and
performing the instant message communication with the user device by the processing module according to the control command and the account pair relation in the database through the data transmission module.

20. A non-transitory computer readable storage medium storing a computer program, the computer program comprising a plurality of commands executable by a computer configured for performing an instant message communication method applied to an instant message communication device, the instant message communication method comprising:
receiving user information by a processing module through a data transmission module, the user information comprising a user account;
driving an instant message software robot by the processing module to add the user account into a robot contact list of a robot account of the instant message software robot;
storing an account pair relation corresponding to the user account and the robot account in a database by the processing module;
controlling the instant message software robot by the processing module to generate a request for adding the instant message software robot to a contact list of a user device having the user account;
controlling the instant message software robot to send the request to the user device through the data transmission module;
determining the robot account of the instant message software robot being added to the contact list of the user device by the processing module; and
controlling the instant message software robot by the processing module to perform an instant message communication with the user device through the data transmission module according to the account pair relation in the database.

* * * * *